(12) United States Patent
Wang

(10) Patent No.: US 10,118,634 B2
(45) Date of Patent: Nov. 6, 2018

(54) PORTABLE SHOPPING CART

(71) Applicant: The Cargo Cart Company, Severna Park, MD (US)

(72) Inventor: Jonathan Wang, Fremont, CA (US)

(73) Assignee: The Cargo Cart Company, Serverna Park, MD (US)

( * ) Notice: Subject to any disclaimer, the term of this patent is extended or adjusted under 35 U.S.C. 154(b) by 0 days.

(21) Appl. No.: 15/285,136

(22) Filed: Oct. 4, 2016

(65) Prior Publication Data

US 2017/0291624 A1     Oct. 12, 2017

(30) Foreign Application Priority Data

Apr. 11, 2016  (CN) .................... 2016 2 0297934 U

(51) Int. Cl.
  *B62B 3/02*   (2006.01)
  *B62B 3/14*   (2006.01)
  *B62B 5/06*   (2006.01)

(52) U.S. Cl.
  CPC .............. *B62B 3/027* (2013.01); *B62B 3/022* (2013.01); *B62B 3/14* (2013.01); *B62B 5/067* (2013.01); *B62B 2205/14* (2013.01); *B62B 2205/20* (2013.01); *B62B 2205/30* (2013.01); *H05K 999/99* (2013.01)

(58) Field of Classification Search
  CPC ........... B62B 3/027; B62B 3/022; B62B 3/14; B62B 5/067; B62B 2205/14; B62B 2205/20; B62B 2205/30
  See application file for complete search history.

(56) References Cited

U.S. PATENT DOCUMENTS

| | | | |
|---|---|---|---|
| 2,133,834 A | 10/1938 | Sheldon | |
| 2,141,881 A | 12/1938 | Schray | |
| 2,212,053 A | 8/1940 | Smith | |
| 2,901,262 A * | 8/1959 | Berlin | B62B 3/027 280/3 |
| 3,326,571 A | 6/1967 | Levine | |
| 3,913,935 A * | 10/1975 | McGillicuddy | B62B 3/027 280/641 |
| 4,047,724 A | 9/1977 | Shaffer | |
| 5,507,507 A | 4/1996 | Davidson | |
| 5,660,476 A | 8/1997 | DeCoster | |
| 5,694,663 A | 12/1997 | Tserng | |
| 6,394,471 B1 | 5/2002 | Watson | |

(Continued)

*Primary Examiner* — Brian L Swenson
(74) *Attorney, Agent, or Firm* — Welsh Flaxman & Gitler LLC

(57) ABSTRACT

A folding shopping cart includes a body frame with a frame connecting base secured at the first end of the body frame. The shopping cart also includes a lower first frame member and an upper second frame member telescopically engaged to define a vertical frame member, wherein a bottom of the lower first frame member is hinged on the frame connecting base. A handlebar is connected with the upper second frame member and front wheels are secured to a second end of the body frame opposite the first end of the body frame. First and second folding rear wheels are respectively secured on opposite sides of the frame connecting base. A button is mechanically linked to a telescopic locking device controlling relative movement between the lower first frame member and the upper second frame member. At least one basket is detachably secured thereto.

19 Claims, 6 Drawing Sheets

(56) References Cited

U.S. PATENT DOCUMENTS

| | | | |
|---|---|---|---|
| 6,575,491 B2 | 6/2003 | Miller | |
| 6,619,546 B1 | 9/2003 | Nguyen et al. | |
| 6,695,324 B1 | 2/2004 | Wu | |
| 6,766,931 B2 | 7/2004 | Wolf | |
| 7,168,715 B1 | 1/2007 | Friedman | |
| 7,188,847 B1 | 3/2007 | Friedman | |
| 7,392,992 B2 | 7/2008 | Stone et al. | |
| 7,566,069 B1 | 7/2009 | Ortega et al. | |
| 7,614,628 B2 * | 11/2009 | O'Connor | A45C 5/143 280/37 |
| 7,703,776 B1 | 4/2010 | Nugent | |
| 7,883,104 B2 | 2/2011 | Driessen | |
| D634,913 S | 3/2011 | Xie | |
| 8,567,809 B2 | 10/2013 | White et al. | |
| 8,844,949 B2 * | 9/2014 | White | B62B 5/067 280/38 |
| 9,050,988 B1 * | 6/2015 | McLeod | B62B 3/022 |
| 9,079,598 B1 * | 7/2015 | Oreyang | B62B 3/022 |
| 2007/0096437 A1 | 5/2007 | Watson | |
| 2008/0303248 A1 | 12/2008 | Chaparro | |
| 2009/0308706 A1 * | 12/2009 | Mao | A45C 5/14 190/8 |
| 2010/0052275 A1 | 3/2010 | Reimers et al. | |
| 2016/0185374 A1 * | 6/2016 | Zhang | B62B 3/02 280/651 |
| 2016/0200339 A1 * | 7/2016 | Dhand | B62B 5/06 280/651 |

\* cited by examiner

PORTABLE SHOPPING CART

BACKGROUND OF THE INVENTION

1. Field of the Invention

The present invention relates to shopping carts. In particular, the present invention relates to folding shopping carts.

2. Description of the Related Art

Shopping carts are a common supermarket shopping tool. The main structure of a shopping cart is a frame and four wheels arranged on the frame. A universal joint connects the two front wheels and the frame to facilitate turning. A basket is installed on the upper part of the frame and a pusher (or handle) is installed on the rear portion of the frame for buyers grasping and applying force to push forward. In addition, some families have their own shopping cart, but the structure is often similar to the supermarket shopping cart. The frame and pusher of most existing shopping carts, and family owned shopping carts, can't be folded. As such, storage and transportation of these shopping carts is extremely inconvenient and the size is also very big.

SUMMARY OF THE INVENTION

The purpose of the present invention is to provide a shopping cart which is capable of being folded for convenient transportation and carrying.

In order to realize the above purpose, a folding shopping cart is disclosed in accordance with the present invention. The folding shopping cart of the present invention includes a body frame, a detachable lower basket supported on the body frame, a lower casing (or lower first frame member) and upper casing (or upper second frame member) defining a telescoping vertical frame member, and a rotatable handlebar connected to the upper second frame member of the vertical frame member. The shopping cart also includes front wheels in the front end of the body frame and a frame connecting base at the back end of the body frame. Two folding rear wheels are provided on the two sides of the frame connecting base adjacent the rear end of the body frame. A button used in controlling movement of the folding shopping cart between a use orientation and a storage orientation is provided in sliding connection with the upper second frame member of the vertical frame member. The bottom of the upper second frame member is slid and inserted into the lower first frame member so as to provide for the ability to telescopically move the upper second frame member within the lower first frame members as the vertical frame member is moved between its use orientation and its storage orientation. The upper second frame member and the lower first frame member are connected by a telescopic locking device which controls the ability of the vertical frame member, that is, the upper second frame member and the lower frame member, to move between its use orientation and its storage orientation.

The bottom of the button is connected with the telescopic locking device by a strut and the bottom of the lower first frame member is hinged on the frame connecting base. A folding locking device is positioned between the bottom of the lower first frame member and the frame connecting base, and is subjected to pressure as the upper second frame member moves downwardly within the lower first frame member. When the upper second frame member moves downwardly within the lower first frame member to the bottom of the lower first frame member, the folding locking device is pressed to unlock the folding shopping cart in a manner allowing the shopping cart to be folded from its use orientation to its storage orientation. The lower first frame member is connected with the two folding rear wheels by a folding linkage mechanism.

The telescopic locking device includes a telescopic locking base on the bottom of the upper second frame member, a telescopic sliding block along a vertical sliding connection on the telescopic locking base, a telescopic slide along a horizontal sliding connection with the telescopic locking base, and a telescopic sliding pin fixed on the telescopic slide in transverse. A telescopic locking spring is positioned between the telescopic slide and the telescopic locking base. A telescopic lock hole responding to the telescopic sliding pin is on the side of the lower first frame member along a top section thereof. The telescopic sliding pin is in the telescopic lock hole. The telescopic sliding block is under the strut. The bottom of the telescopic sliding block is equipped with a pushing bevel. The telescopic sliding block is equipped with a pushed bevel responding to the pushing bevel; that is, when the pushing bevel is pressed on the pushed bevel.

The folding locking device includes a folding locking base on the bottom of the lower first frame member, a folding putter (or actuation lever) along a vertical sliding connection with the folding locking base, and a folding locking pin along a horizontal sliding connection on the folding actuation lever. The top of the folding actuation lever extends to the location and can be pressed by the upper second frame member. A locking slot responding to the folding locking pin is on the inside of the frame connecting base. The folding locking pin is slidably disposed in the locking slot.

The folding linkage mechanism includes a folding connecting rod and a folding sliding block along a vertical sliding connection with the body frame. The front and the end of the folding connecting rod are respectively hinged with the folding sliding block and the folding locking base. The two folding rear wheels are respectively connected with the folding sliding block.

Each of the folding rear wheels includes a rear wheel base, a rear wheel on the rear wheel base, a rear rod, and a connecting rod. One end of the rear rod and the connecting rod are hinged with the frame connecting base. The other end of the rear rod and the connecting rod are hinged with the rear wheel base. The rear rod, the connecting rod, the rear wheel base and the frame connecting base form the four connection elements of the folding mechanism. One end of the connecting rod extends to connect with the folding sliding block.

The body frame is sleeve-shaped, and a folding linkage mechanism is positioned in the body frame.

The frame connecting base includes a lower hook to seize the lower basket and a locking hook along a vertical sliding connection with the body frame. There is a return spring between the locking hook and the body frame. In practice, the lower hook is stuck in the back end of the lower basket, and the locking hook is clamped at the front end of the lower basket under the elastic action of the return spring.

Above the lower basket described above, there is an upper basket selectively secured to a supporting slot on the front end of the lower first frame member. Above the supporting slot, there is an upper hook on the front end of the upper second frame member. The bottom of the upper basket is stuck in the supporting slot and the top of the upper basket's back end catches on the upper hook.

The beneficial effect of the folding shopping cart in accordance with the present invention are achieved by providing the body frame, lower basket, lower first frame member, upper second frame member, rotatable handlebar, front wheel, frame connecting base, two folding rear wheels, and button. The bottom of the upper second frame member is telescopically slid and inserted into the lower first frame member. The upper second frame member and the lower first frame member are connected by a telescopic locking device. The bottom of the button is connected with the telescopic locking device by the strut. The bottom of the lower first frame member is hinged on the frame connecting base. The folding locking device is between the bottom of the lower first frame member and the frame connecting base. When folding by pressing the button and the rod, the telescopic locking device is pressed to unlock. The upper second frame member moves downwardly into the lower first frame member and, when the upper second frame member reaches the bottom of the lower first frame member, the folding locking device is pressed to realize the unlocking of the folding shopping cart. Then the lower first frame member moves forward and drives the two folding rear wheels fold towards to the body frame through the provision of a folding linkage mechanism. The present folding shopping cart controls the folding operation through the provision of a button which is simple. This technique greatly reduces the volume of the cart after folding and provides for a shopping cart that is easy to transport and/or carry. The cart can be conveniently placed in a car.

With the foregoing in mind, it is therefore an object of the present invention to provide a folding shopping cart including a body frame with a frame connecting base secured at the first end of the body frame. The shopping cart also includes a lower first frame member and an upper second frame member telescopically engaged to define a vertical frame member, wherein a bottom of the lower first frame member is hinged on the frame connecting base. A handlebar is connected with the upper second frame member and front wheels are secured to a second end of the body frame opposite the first end of the body frame. First and second folding rear wheels are respectively secured on opposite two sides of the frame connecting base. A button is in sliding connection with the upper second frame member, the button being mechanically linked to a telescopic locking device controlling relative movement between the lower first frame member and the upper second frame member. At least one basket is detachably secured thereto. In use, the folding shopping cart is moved between a use orientation where it is fully extended and a folded storage orientation where the vertical frame member is folded relative to the body frame and the first and second folding rear wheels are folded toward the body frame.

It is also an object of the present invention to provide a folding shopping cart wherein the handlebar is rotatably connected with the upper second frame member.

It is another object of the present invention to provide a folding shopping cart wherein the upper second frame member is slid and inserted into the lower first frame member defining a telescopic relationship between the upper second frame member and the lower first frame member.

It is a further object of the present invention to provide a folding shopping cart wherein the upper second frame member and the lower first frame member are connected by a telescopic locking device, and a bottom of the button is connected with the telescopic locking device by a strut extending between the button and the telescopic locking device.

It is also an object of the present invention to provide a folding shopping cart wherein a folding locking device is positioned between the bottom of the lower first frame member and the frame connecting base, the folding locking device being subjected to pressure by a bottom of the upper second frame member as the upper second frame member moves downwardly within the lower first frame member in a manner allowing the folding shopping cart to transition from a use orientation to a folded orientation.

It is another object of the present invention to provide a folding shopping cart wherein each of the folding rear wheels includes a rear wheel base, a rear wheel on the rear wheel base, a rear rod and a connecting rod.

It is a further object of the present invention to provide a folding shopping cart wherein one end of the rear rod and the connecting rod are hinged with a frame body connection, and another end of each of the rear rod and connecting rod are hinged with the rear wheel base, such that the rear rod, connecting rod, rear wheel base and frame body connection form four connecting elements of a folding mechanism.

It is also an object of the present invention to provide a folding shopping cart wherein the frame connecting base includes a lower hook to seize the lower basket and a locking hook in a vertical sliding connection with the body frame.

It is another object of the present invention to provide a folding shopping cart wherein a return spring is positioned between the locking hook and the body frame.

It is a further object of the present invention to provide a folding shopping cart wherein the upper basket is supported by a supporting slot on a top and front end of the lower first frame member and an upper hook on a top and front end of the upper second frame member.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Figure 1:
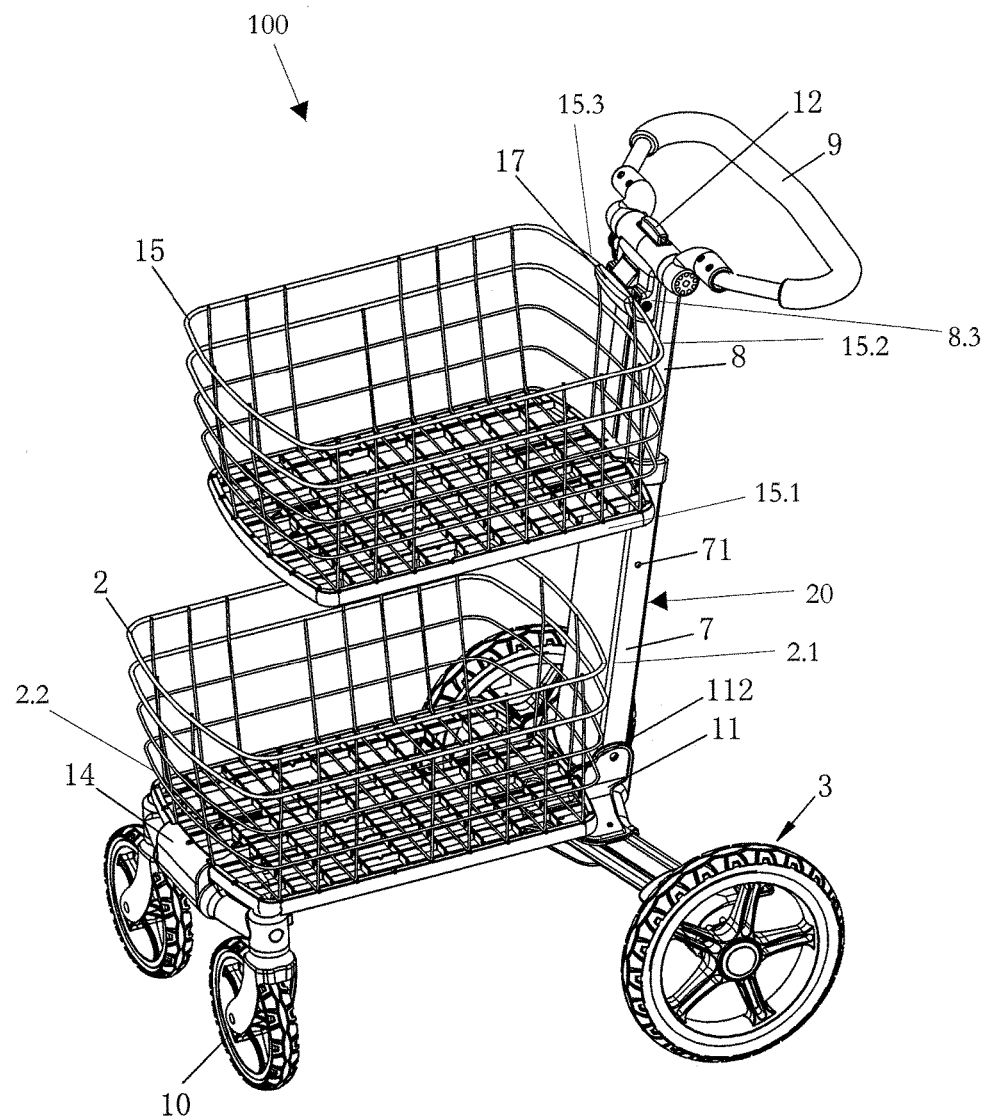
FIG. 1 is a schematic diagram of the structure of the folding shopping cart.
Figure 2:
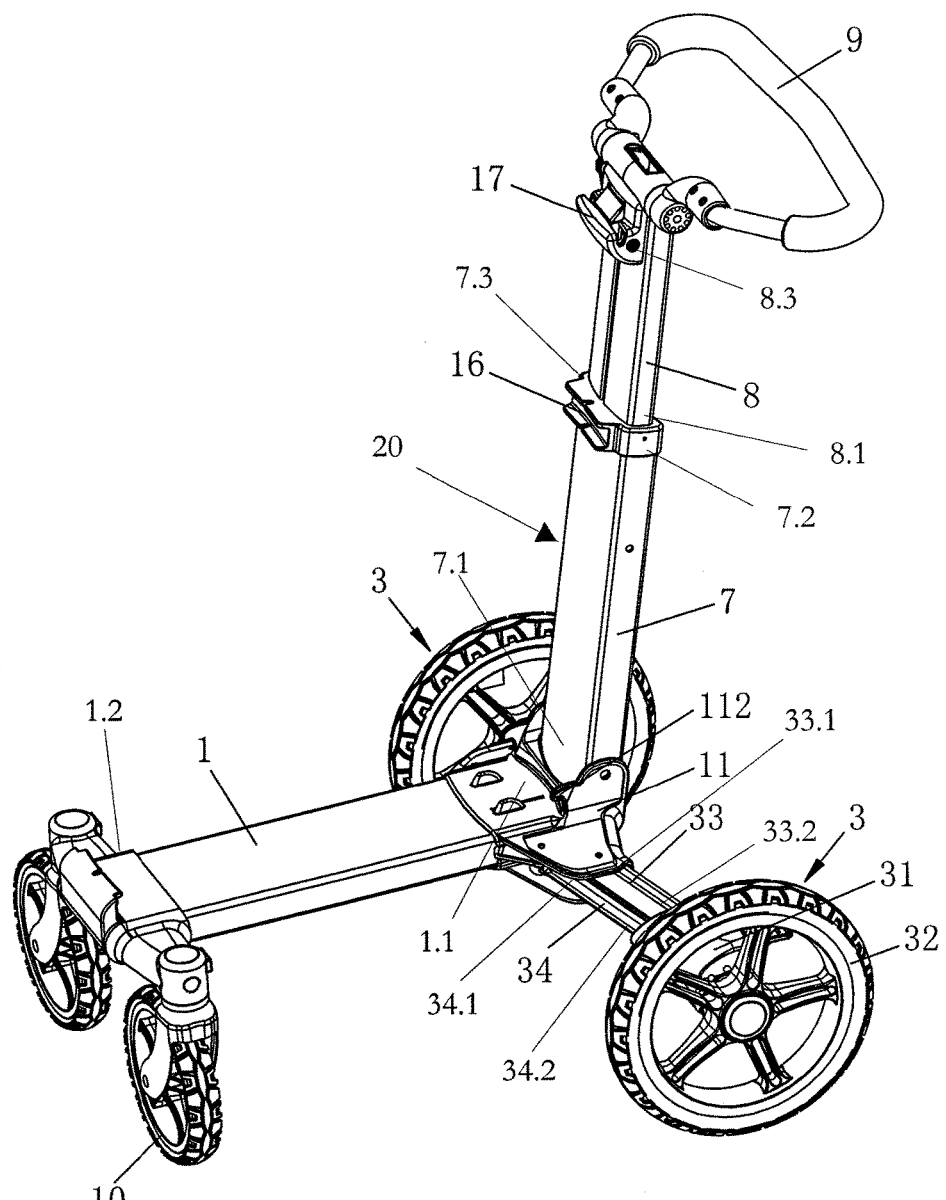
FIG. 2 is a schematic diagram of the structure of the upper and lower shopping baskets.
Figure 3:
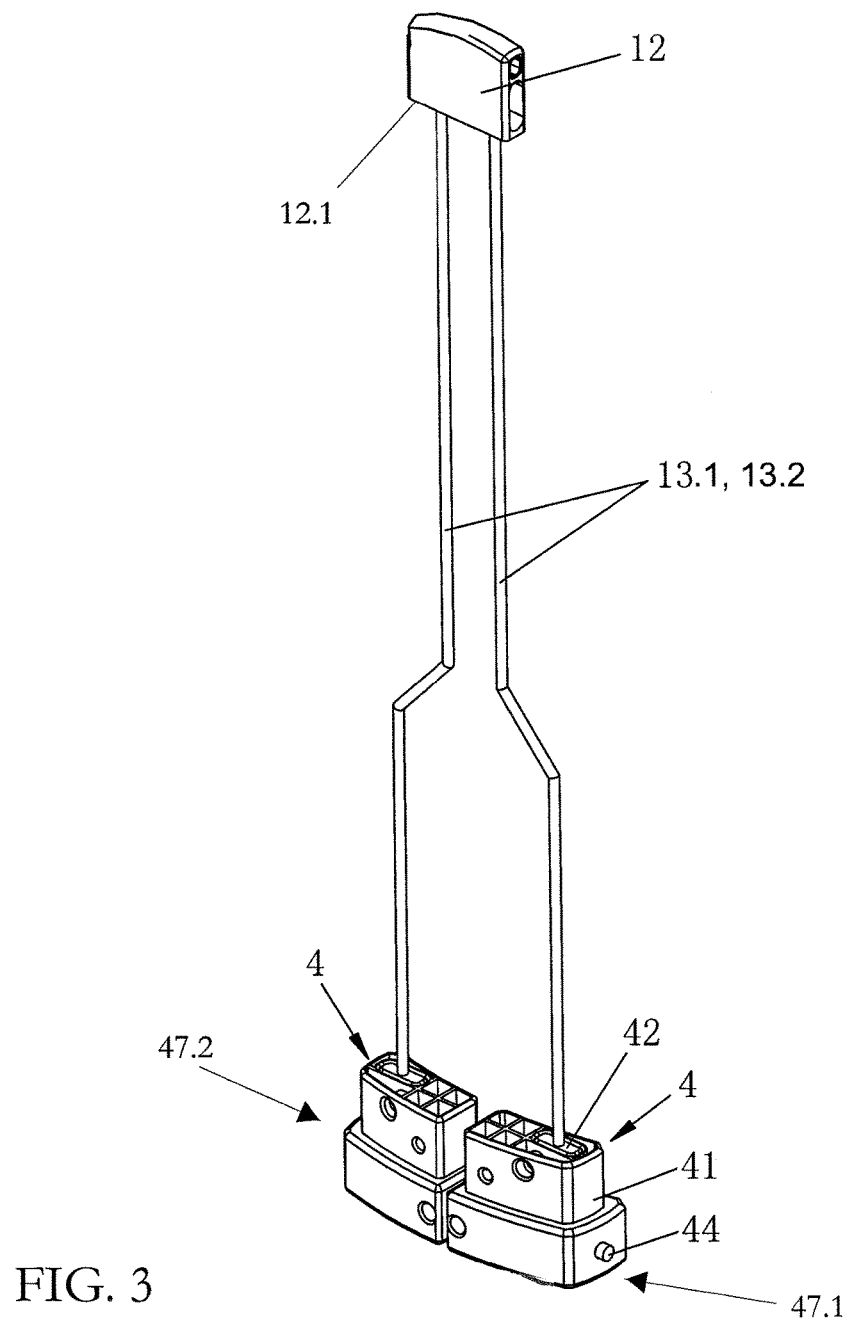
FIG. 3 is a schematic diagram of the connection between the button and the telescopic locking device of the folding shopping cart.
Figure 5:
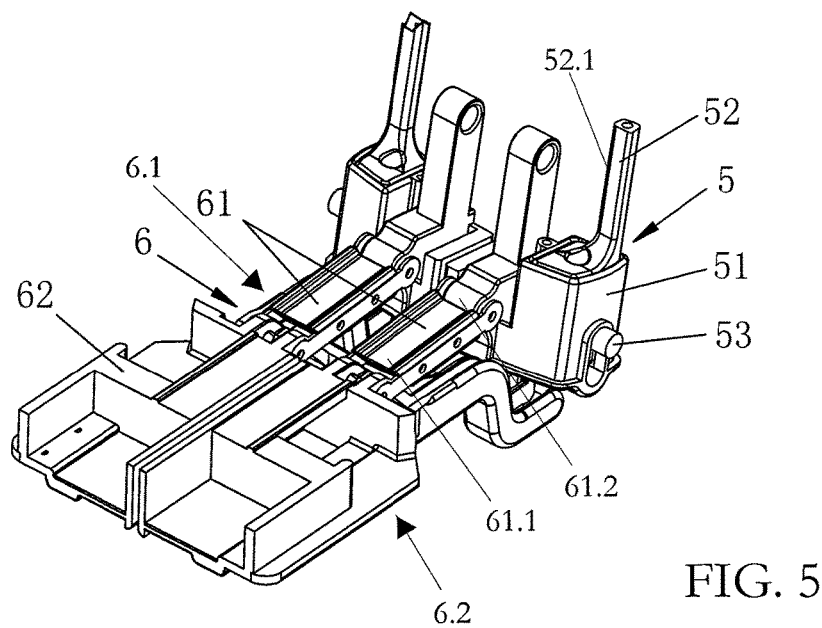
FIG. 5 is a connection schematic diagram of the folding locking device and the folding linkage mechanism of the folding shopping cart.
Figure 6:
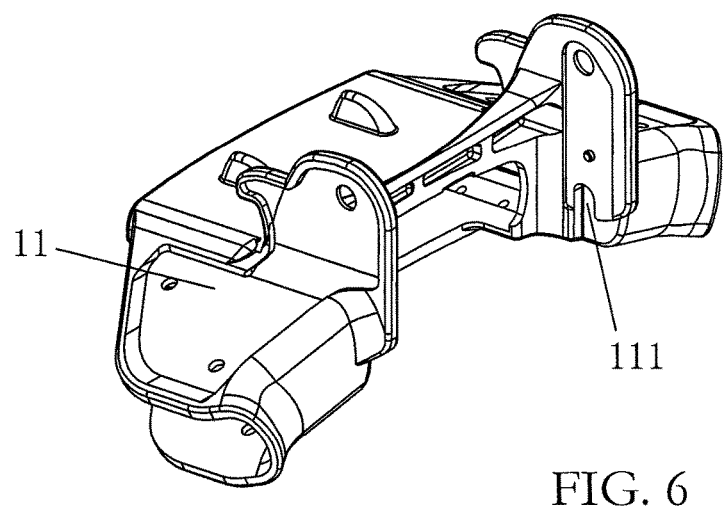
FIG. 6 is a structure schematic diagram of the frame connecting base of the folding shopping cart.
Figure 7:
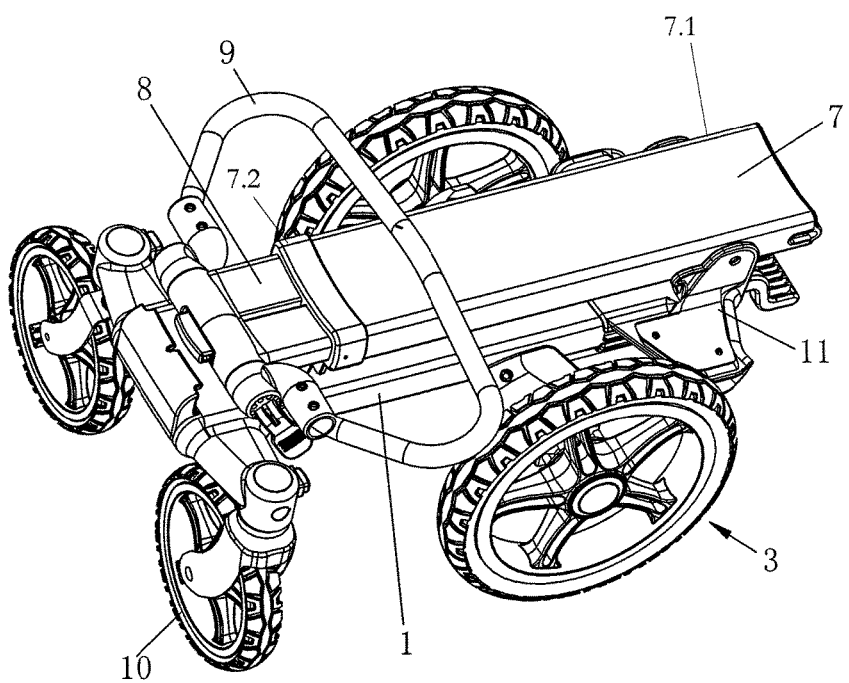
FIG. 7 is a schematic diagram of the structure after the folding of the folding shopping cart.

With reference to FIGS. 1-7, a folding shopping cart 100 in accordance with the present invention is shown. The folding shopping cart 100 is constructed to conveniently and reliably move between the use orientation where it is fully extended as shown in FIG. 1 and the folded storage orientation where a vertical frame member 20 is folded relative to a body frame 1 and first and second folding rear wheels 3 are folded toward the body frame 1 as shown in FIG. 7. The folding shopping cart 100 includes a body frame 1, a detachable lower basket 2 supported on the body frame 1, a lower first frame member 7 and an upper second frame member 8 defining a vertical frame member 20, a rotatable handlebar 9 connected with the upper second frame member 8, and front wheels 10 on the front (or second end 1.2) of the body frame 1. The folding shopping cart 100 also includes a frame connecting base 11 at the first (or back) end 1.1 of the body frame 1, two folding rear wheels 3 on the two sides of the frame connecting base 11, and a button 12 in sliding connection with the upper second frame member 8 of the vertical frame member 7 for controlling actuation of the folding shopping cart 100 between its use orientation and its storage orientation. The bottom 7.1 of the lower first frame member 7 is hinged on the frame connecting base 11.

Considering the telescopic construction of the vertical frame member 20, the bottom 8.1 of the upper second frame member 8 is slid and inserted into the lower first frame member 7 defining a telescopic relationship between the upper second frame member 8 and the lower first frame member 7. The upper second frame member 8 and the lower first frame member 7 are connected by a telescopic locking device 4 extending therebetween in a manner allowing for selective locking and release of the lower first frame member 7 and the upper second frame member 8 relative to each other.

Figure 4:
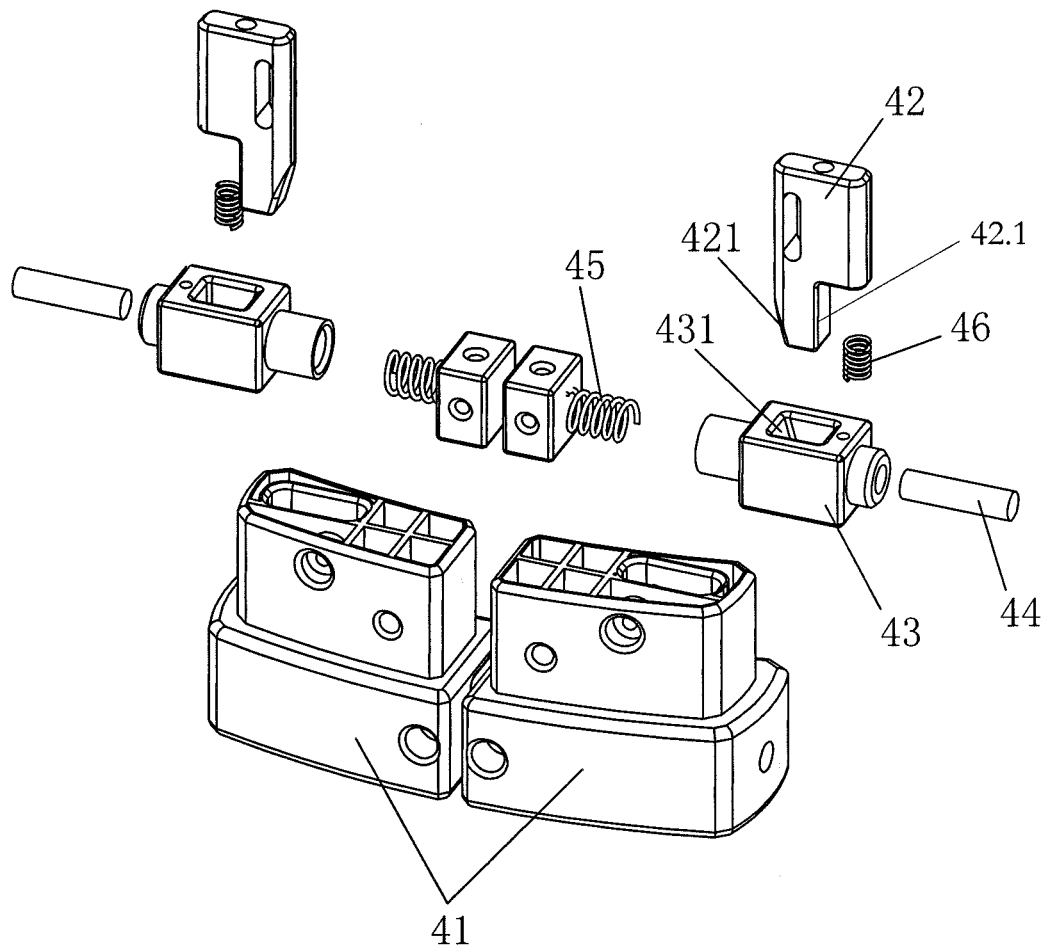
FIG. 4 is a schematic diagram of the structure of the telescopic locking device of the folding shopping cart.

Referring to FIGS. 1, 4 and 5, the bottom 12.1 of the button 12 is connected with the telescopic locking device 4 by a pair of struts 13.1, 13.2 extending therebetween in a manner allowing for the transmission of force generated upon pressing downwardly upon the button 12 so as to actuate the telescopic locking device 4 to unlock the lower first frame member 7 relative to the upper second frame member 8 and allow for movement of the upper second frame member 8 downwardly within the lower first frame member 7.

In particular, the telescopic locking device 4 includes first and second telescopic locking assemblies 47.1, 47.2 in an opposed relationship such that the first telescopic locking assembly 47.1 acts upon a left side of the lower first frame member 7 and the upper second frame member 8 to control relative movement thereof and the second telescopic locking assembly 47.2 acts upon a right side of the lower first frame member 7 and the upper second frame member 8 to control relative movement thereof. The first and second locking assemblies 47.1, 47.2 are linked to the button 12 by respective first and second struts 13.1, 13.2 extending from the button 12 for actuation of the telescopic locking device 4 when the button 12 is pressed downwardly.

Each of the first and second telescopic locking assemblies 47.1, 47.2 includes a telescopic locking base 41 positioned on the bottom 8.1 of the upper second frame member 8, a telescopic sliding block 42 in a vertical sliding connection on the telescopic locking base 41, a telescopic slide 43 in a horizontal sliding connection with the telescopic locking base 41, and a telescopic sliding pin 44 fixed on the telescopic slide 43 so as to extend transversely (that is, perpendicular to the longitudinal axis of the vertical frame member 20). A telescopic locking spring 45 is positioned between the telescopic slide 43 and the telescopic locking base 41. Telescopic lock holes 71 responding to the telescopic sliding pin 44 are positioned on opposite sides of the first frame member 7 at a position on the top side 7.2 of the lower first frame member 7. That is, the telescopic lock holes 71 are shaped and dimensioned so as to selectively receive the telescopic sliding pins 44 therein when it is desired to lock the lower first frame member 7 relative to the upper second frame member 8 and allow the telescopic sliding pins to be withdrawn from the telescopic lock holes 71 when it is desired to unlock the lower first frame member 7 relative to the upper second frame member 8 to initiate the transition from its use orientation to its storage orientation.

In practice, the telescopic sliding pin 44 of each of the first and second telescopic locking assemblies 47.1, 47.2 is positioned for selective insertion within the telescopic lock hole 71 and a telescopic sliding block 42 is under the strut 13.1, 13.2. The bottom 42.1 of the telescopic sliding block 42 is equipped with a pushing bevel 421 and the telescopic slide 43 is equipped with a pushed bevel 431 responding to the pushing bevel 421 when the pushing bevel 421 is pressed on the pushed bevel 431. The pushing bevel 421 and the pushed bevel 431 are shaped and dimensioned such that vertical movement (or other linear movement) of the pushing bevel 421 causes horizontal movement (or movement perpendicular to the movement of the pushing bevel 421) of the pushed bevel 431, and vice versa.

When pressing the button 12, the button 12 drives the struts 13.1, 13.2 to press the respective telescopic sliding blocks 42 and the telescopic sliding blocks 42 push the telescopic slides 43. The telescopic sliding pins 44 slide inwardly toward the center of the vertical frame member 20 (and away from the telescopic lock holes 71 formed in the lower first frame member through the interaction between the pushing bevels 421 and the pushed bevels 431). The telescopic sliding pins 44 then break away from the telescopic lock holes 71 to realize the unlocking of the telescopic locking device 4 relative to the lower first frame member 7 and the upper second frame member 8. A spring 46 is positioned between each of the telescopic sliding blocks 42 and the telescopic locking bases 41. The spring 46 forces the telescopic sliding blocks 42, and struts 13.1, 13.2 upward causing the button 12 to reset after pressing.

With reference to FIGS. 5 and 6, a folding locking device 5 is positioned between the bottom 7.1 of the lower first frame member 7 and the frame connecting base 11 to control movement of the lower first frame member 7 (and ultimately the vertical frame member 20) relative to the body frame 1 as the folding shopping cart 100 is moved between its use orientation and its storage orientation. When not actuated, the folding locking device hold the lower first frame member 7 (and ultimately the vertical frame member 20) relative to the body frame 1 at an angle of approximately 90 degrees. However, when the folding locking device 5 is actuated as described below, the bottom 7.1 of the lower first frame member 7 is unlocked relative to the body frame 1 allowing the lower first frame member 7 to rotate toward the body frame 1 and into a storage orientation.

The folding locking device 5 is controlled by the application of pressure from the bottom 8.1 of the upper second frame member 8 as the upper second frame member 8 moves downwardly within the lower first frame member 7. When the upper second frame member 8 shrinks (moves) to the bottom 7.1 of the lower first frame member 7, the folding locking device 5 is pressed by the bottom 8.1 of the upper second frame member 8 to unlock the folding locking device 5 and allow for folding of the folding shopping cart 100 in a manner allowing the folding shopping cart 100 to transition from its use orientation as shown in FIG. 1 to its folded storage orientation as shown in FIG. 7.

The folding locking device 5 includes first and second folding locking devices 55.1, 55.2 on the left and right sides of the body frame 1 and the lower first frame member 7. Each of the first and second locking devices 55.1, 55.2 includes a folding locking base 51 positioned on the bottom 7.1 of the lower first frame member 7, a folding actuation lever 52 in a vertical sliding connection with the folding locking base 51, and a folding locking pin 53 in a horizontal sliding connection on the folding actuation lever 52. The top 52.1 of the folding actuation lever 52 extends to a location where it can be pressed by the upper second frame member 8.

Locking slots 111 (only one is shown in FIG. 6, although an identical locking slot is provided on the opposite side of the frame body connection 11), responding to the folding locking pins 53, are positioned on the inside of the frame body connection 11 for selective engagement with respective folding locking pins 53. The folding locking pins 53 are slidably disposed in the locking slots 111. When the upper second frame member 8 moves to the bottom 7.1 of the lower first frame member 7, the bottom 8.1 of the upper second frame member 8 will press the folding actuation levers 52 to make the folding locking pins 53 move down together with the folding actuation levers 52 and break away (or disengage) from the locking slot 111. Once the folding locking pins 53 are disengaged from the locking slot 111, the lower first frame member 7 is free to move forward to fold and realize the unlocking of the folding locking device 5.

Referring to FIG. 5, a folding linkage mechanism 6 connects the lower first frame member 7 with the two folding rear wheels 3 positioned at the rear end 1.1 of the body frame 1. As will be explained below, the linkage assembly defined by the folding linkage mechanism 6 allows for the rear wheels 3 to move inwardly toward the body frame 1 as the folding shopping cart 100 is moved between its use orientation and its storage orientation.

The folding linkage mechanism 6 includes first and second folding linkage mechanism assemblies 6.1, 6.2 positioned on opposite sides of the body frame 1 and the lower first frame member 7. Each of the first and second folding linkage mechanism assemblies 6.1, 6.2 includes a folding connecting rod 61 and a folding sliding block 62 in a sliding connection with the body frame 1. The front first end 61.1 and the back second end 61.2 of the folding connecting rod 61 are respectively hinged with the folding sliding block 62 and the folding locking base 51. The two folding rear wheels 3 are respectively connected with the folding sliding block 62. When the lower first frame member 7 moves forward and folds, the folding connecting rods 61 and the folding sliding blocks 62 move toward the front (or second) end 1.2 of the body frame 1 together. At the same time, the folding rear wheels 3 fold relative to the body frame 1 and toward the body frame 1 under the control of the folding sliding block 62 to realize the folding of the folding linkage mechanism 6. The operation is easy and convenient.

Each of the folding rear wheels 3 includes a rear wheel base 31, a rear wheel 32 on the rear wheel base 31, a rear rod 33 and a connecting rod 34. One end 33.1, 34.1 of each of the rear rod 33 and the connecting rod 34 are hinged with the frame body connection 11. The other end 33.2, 34.2 of each of the rear rod 33 and connecting rod 34 are hinged with the rear wheel base 31. The rear rod 33, connecting rod 34, rear wheel base 31 and frame body connection 11 form the four connecting elements of the folding mechanism. One end of the connecting rod 34 extends to connect with the folding sliding block 62 which moves backward and forward to drive the folding of the four connecting elements of the folding mechanism.

The body frame 1 is of an elongated shape and the folding linkage mechanism 6 is on the back (or first) end 1.1 of the body frame 1. The folding linkage mechanism 6 is concealed, even the rod is concealed. The structure is simple, prevents pinching, and provides for better safety.

The frame connecting base 11 positioned at the back end 1.1 of the body frame 1 includes a lower hook 112 to seize the back end 2.1 of the lower basket 2 and the front end 1.2 of the body frame 1 includes a locking hook 14 in a vertical sliding connection with the body frame 1. A return spring is positioned between the locking hook 14 and the body frame 1. In practice, and when one wishes to secure the lower basket 2 to the shopping cart 100, the lower hook 112 is stuck in the back end 2.1 of the lower basket 2. The locking hook 14 is clamped at the front end 2.2 of the lower basket 2 under the elastic action of a return (or reset) spring (not shown). When placing the lower basket 2 upon the shopping cart 100, the front end 2.2 of the lower basket 2 is stuck in the locking hook 14. Then, while pushing forward the locking hook 14 is engaged with the lower basket 2 and the front end 2.2 of the lower basket 2 is stuck in the lower hook 112. The locking hook 14 fixes the front end 2.2 of the lower basket 2 under the elastic effect of a return (or reset) spring. When taking down the lower basket 2, one pushes forward on the locking hook 14 and the front end 2.2 of the lower basket 2 is allowed to break away from the lower hook 112. This mechanism for taking down the lower basket 2 is very convenient.

Above the lower basket 2 there is an upper basket 15 supported by a supporting slot 16 on the top and front end 7.3 of the lower first frame member 7. Above the supporting slot 16 there is an upper hook 17 on the top and front end 8.3 of the upper second frame member 8. The bottom 15.1 of the upper basket 15 is stuck in the supporting slot 16 and the top 15.2 of the back end 15.3 of the upper basket 15 catches on the upper hook 17. This mechanism for attachment and detachment of the upper basket 15 is convenient.

When folding, the baskets 2, 15 are first removed. Thereafter, pressing the button 12 and the rods 13.1, 13.2 causes the telescopic locking device 4 to unlock. The upper second frame member 8 moves down within the lower first frame member 7 and, when the upper second frame member 8 moves to the bottom of the lower first frame member 7, the folding locking device 5 is pressed to realize unlocking of the folding mechanism. The lower first frame member 7 then moves forward and drives the two folding rear wheels 3 to fold toward the body frame 1 through the folding linkage mechanism 6. The folding shopping cart 100 controls the folding operation through a button 12 which is simple. This technique greatly reduces the volume of the cart after folding and it is easy to transport and/or carry. The cart can be conveniently placed in a car.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A folding shopping cart, comprising:
    a body frame with a frame connecting base secured at the first end of the body frame;
    a lower first frame member and an upper second frame member telescopically engaged to define a vertical frame member, a bottom of the lower first frame member being hinged on the frame connecting base, wherein the upper second frame member is slid and inserted into the lower first frame member defining a telescopic relationship between the upper second frame member and the lower first frame member;

a handlebar connected with the upper second frame member;

front wheels secured to a second end of the body frame opposite the first end of the body frame;

first and second folding rear wheels respectively secured on opposite sides of the frame connecting base;

a button in sliding connection with the upper second frame member, the button being mechanically linked to a telescopic locking device controlling relative movement between the lower first frame member and the upper second frame member, wherein the upper second frame member and the lower first frame member are connected by a telescopic locking device, and a bottom of the button is connected with the telescopic locking device by a strut extending between the button and the telescopic locking device;

at least one basket detachably secured thereto; and a folding locking device is positioned between the bottom of the lower first frame member and the frame connecting base, the folding locking device being subjected to pressure by a bottom of the upper second frame member as the upper second frame member moves downwardly within the lower first frame member in a manner allowing the folding shopping cart to transition from a use orientation to a folded orientation;

wherein the folding shopping cart is moved between a use orientation where it is fully extended and a folded storage orientation where the vertical frame member is folded relative to the body frame and the first and second folding rear wheels are folded toward the body frame.

2. The folding shopping cart according to claim 1, wherein the handlebar is rotatably connected with the upper second frame member.

3. The folding shopping cart according to claim 1, wherein each of the folding rear wheels includes a rear wheel base, a rear wheel on the rear wheel base, a rear rod and a connecting rod.

4. The folding shopping cart according to claim 3, wherein one end of the rear rod and the connecting rod are hinged with a frame body connection, and another end of each of the rear rod and connecting rod are hinged with the rear wheel base, such that the rear rod, connecting rod, rear wheel base and frame body connection form four connecting elements of a folding mechanism.

5. The folding shopping cart according to claim 1, wherein each of the folding rear wheels includes a rear wheel base, a rear wheel on the rear wheel base, a rear rod and a connecting rod, and one end of the rear rod and the connecting rod are hinged with a frame body connection, and another end of each of the rear rod and connecting rod are hinged with the rear wheel base such that the rear rod, connecting rod rear wheel base and frame body connection form four connecting elements of a folding mechanism.

6. The folding shopping cart according to claim 1, wherein the frame connecting base includes a lower hook to seize the lower basket and a locking hook in a vertical sliding connection with the body frame.

7. The folding shopping cart according to claim 6, wherein a return spring is positioned between the locking hook and the body frame.

8. A folding shopping cart, comprising:
a body frame with a frame connecting base secured at the first end of the body frame;
a lower first frame member and an upper second frame member telescopically engaged to define a vertical frame member a bottom of the lower first frame member being hinged on the frame connecting base;
a handlebar connected with the upper second frame member;
front wheels secured to a second end of the body frame opposite the first end of the body frame;
first and second folding rear wheels respectively secured on opposite sides of the frame connecting base;
a button in sliding connection with the upper second frame member, the button being mechanically linked to a telescopic locking device controlling relative movement between the lower first frame member and the upper second frame member;
at least one basket detachably secured thereto; and
a folding locking device is positioned between the bottom of the lower first frame member and the frame connecting base, the folding locking device being subjected to pressure by a bottom of the upper second frame member as the upper second frame member moves downwardly within the lower first frame member in a manner allowing the folding shopping cart to transition from a use orientation to a folded orientation
wherein the folding shopping cart is moved between a use orientation where it is fully extended and a folded storage orientation where the vertical frame member is folded relative to the body frame and the first and second folding rear wheels are folded toward the body frame.

9. The folding shopping cart according to claim 8, wherein the handlebar is rotatably connected with the upper second frame member.

10. The folding shopping cart according to claim 8, wherein each of the folding rear wheels includes a rear wheel base, a rear wheel on the rear wheel base, a rear rod and a connecting rod, and one end of the rear rod and the connecting rod are hinged with a frame body connection, and another end of each of the rear rod and connecting rod are hinged with the rear wheel base, such that the rear rod, connecting rod, rear wheel base and frame body connection form four connecting elements of a folding mechanism.

11. The folding shopping cart according to claim 8, wherein the frame connecting base includes a lower hook to seize the lower basket and a locking hook in a vertical sliding connection with the body frame.

12. The folding shopping cart according to claim 11, wherein a return spring is positioned between the locking hook and the body frame.

13. A folding shopping cart, comprising:
a body frame with a frame connecting base secured at the first end of the body frame;
a lower first frame member and an upper second frame member telescopically engaged to define a vertical frame member a bottom of the lower first frame member being hinged on the frame connecting base;
a handlebar connected with the upper second frame member;
front wheels secured to a second end of the body frame opposite the first end of the body frame;
first and second folding rear wheels respectively secured on opposite sides of the frame connecting base;
a button in sliding connection with the upper second frame member the button being mechanically linked to a telescopic locking device controlling relative movement between the lower first frame member and the upper second frame member; and at least one basket detachably secured thereto, wherein the at least one basket is supported by a supporting slot on a top and front end of lower first frame member and an upper hook on a top and front end of upper second frame member;

wherein the folding shopping cart is moved between a use orientation where it is fully extended and a folded storage orientation where the vertical frame member is folded relative to the body frame and the first and second folding rear wheels are folded toward the body frame.

14. The folding shopping cart according to claim 13, wherein the upper second frame member is slid and inserted into the lower first frame member defining a telescopic relationship between the upper second frame member and the lower first frame member.

15. The folding shopping cart according to claim 14, wherein the upper second frame member and the lower first frame member are connected by a telescopic locking device, and a bottom of the button is connected with the telescopic locking device by a strut extending between the button and the telescopic locking device.

16. The folding shopping cart according to claim 13, wherein the handlebar is rotatably connected with the upper second frame member.

17. The folding shopping cart according to claim 13, wherein each of the folding rear wheels includes a rear wheel base, a rear wheel on the rear wheel base, a rear rod and a connecting rod, and one end of the rear rod and the connecting rod are hinged with a frame body connection, and another end of each of the rear rod and connecting rod are hinged with the rear wheel base, such that the rear rod, connecting rod, rear wheel base and frame body connection form four connecting elements of a folding mechanism.

18. The folding shopping cart according to claim 13, wherein the frame connecting base includes a lower hook to seize the lower basket and a locking hook in a vertical sliding connection with the body frame.

19. The folding shopping cart according to claim 18, wherein a return spring is positioned between the locking hook and the body frame.

* * * * *